Aug. 20, 1963  W. BOCK ETAL  3,100,906
WINDSHIELD WASHING PUMP WITH SWITCH FOR WINDSHIELD
WIPER MOTOR FOR MOTOR VEHICLES
Filed June 29, 1959
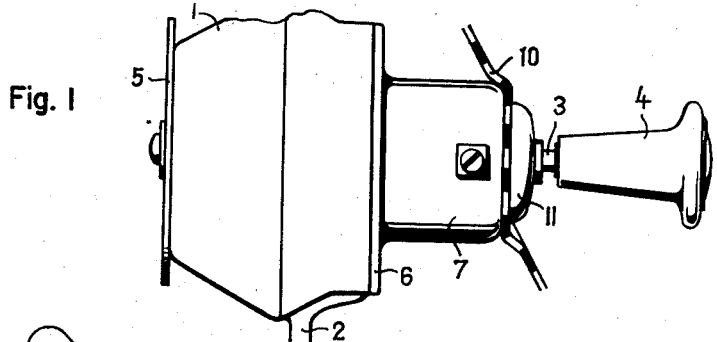
Fig. 1
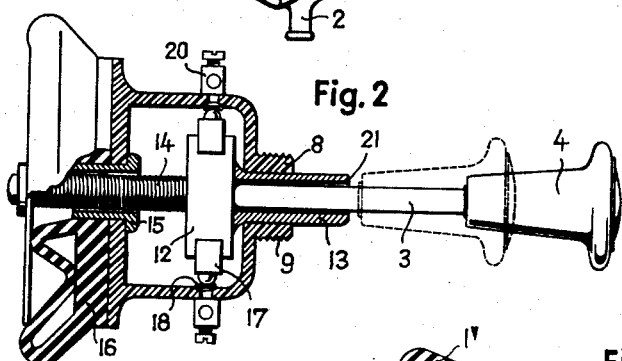
Fig. 2
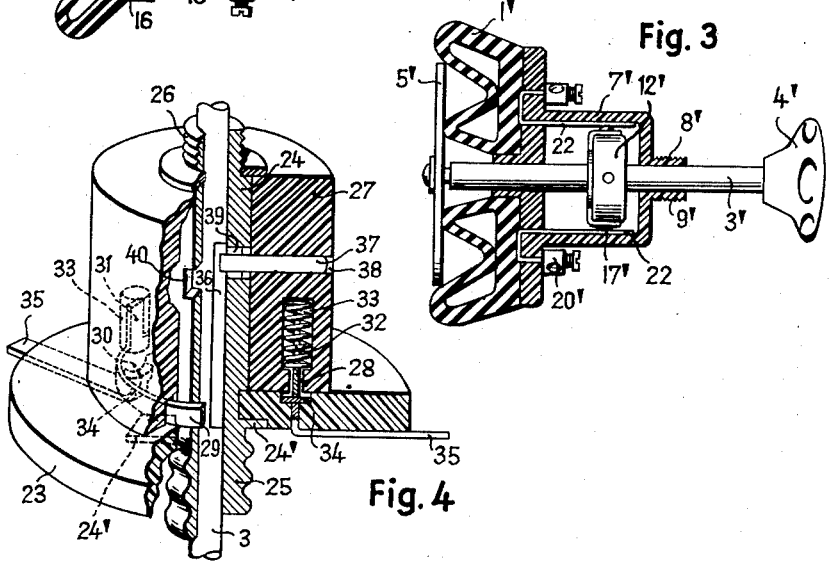
Fig. 3
Fig. 4
INVENTORS
WILLY BOCK
ERICH MUTSCHLER
FRANZ SCHREIBER
BY Dicke, Craig & Freudenberg
ATTORNEYS

3,100,906
WINDSHIELD WASHING PUMP WITH SWITCH FOR WINDSHIELD WIPER MOTOR FOR MOTOR VEHICLES
Willy Bock and Erich Mutschler, Bietigheim, Wurttemberg, and Franz Schreiber, Kirchheim (Neckar), Wurttemberg, Germany, assignors to SWF-Spezialfabrik für Autozubehör Gustav Rau G.m.b.H., Bietigheim, Wurttemberg, Germany
Filed June 29, 1959, Ser. No. 823,604
Claims priority, application Germany June 27, 1958
6 Claims. (Cl. 15—250.02)

The present invention relates to a pump for a windshield washing apparatus for motor vehicles, and to the combination of such a pump with a switch for operating a motor of a windshield wiping apparatus.

Prior to this invention there have been similar pumps in which the actuating mechanism of the pump was provided with an electric contact for switching on the motor of the windshield wiper while the pump was being operated. There have also been combined windshield washing and wiping apparatus which had a common switch for starting the windshield wiper motor as well as the pump driving mechanism. In these prior apparatus, the operation of the pump therefore always also resulted in the operation of the windshield wiper. Furthermore, the known windshield wiping and washing apparatus required a considerable amount of space within the vehicle and they were rather expensive.

It is an object of the present invention to provide a hand-actuated pump for a windshield washing apparatus which may be operated either independently of the windshield wiper or so as also to control the wiper motor.

Another object of the invention is to provide such a pump which is of a very simple and inexpensive construction and has the additional advantage that it may be mounted directly on the dashboard of an automobile.

A further object of the invention is to provide such a hand pump in which the actuating member thereof is combined with the switch for controlling the windshield wiper motor so as to form a single structural unit.

A still further object of the invention is to provide a hand pump of the mentioned type with an actuating member in the form of a control rod or plunger which may be pulled outwardly or pushed inwardly to act upon a pump piston or in a bellows pump, upon the bellows, and which is coupled with the movable part of an electric switch for the wiper motor in such a manner that the operation either of the pump or the switch will require an intermittent movement of the control rod either in one direction or in different directions. Such operation may, for example, consist in a pull on the control rod for actuating the switch and a further pull thereon for actuating the pump, or it may consist in a pull on the control rod merely for actuating the pump and a turning of the control rod about its axis in any pulled position thereof for actuating the switch. The mechanism may be further devised so that, if the control rod is pulled and in the switch-engaging position, the pump will automatically return to its normal position, while a disengagement of the switch will require a positive movement of the control rod by the driver.

According to one embodiment of the invention, the pump may be combined with the switch by arranging the actual pump element, for example, the bellows or piston, and a rotary switch coaxially behind each other on the control rod carrying a control knob or the like on its outer end, and by providing suitable common mounting means for holding the pump and switch parts in their required relative positions.

Thus, for example, in a rubber-bellows pump, the body or housing of the pump may be provided with a guide bushing which serves for mounting the pump directly on the rear side of the dashboard and in which the control rod is slidable which carries a control knob on its outer end at the front side of the dashboard. The other end of the control rod is rotatably connected to a disk which is adapted to compress the rubber bellows when the control rod is pulled toward the inside of the car. The switch mechanism may then in its simplest form consist of a pair of interconnected electric contacts which are mounted on the control rod within the pump housing behind the dashboard and which are adapted to engage with a pair of contact bars extending parallel to the control rod on the inside of the pump housing. When the control knob and the control rod thereon is then turned about its axis to one position, the slide contacts on the control rod will be in engagement with the contact bar, and the windshield wiper motor will be switched on regardless of whether or not the control rod will be actuated to operate the pump, while when the control knob is turned to another position, the slide contact on the control rod will be turned out of engagement with the contact bar so that the pump may then be operated while the wiper motor is switched off.

The switch may, however, also be of the sliding type and designed so that, when the control rod is first actuated, for example, by being partly pulled out, the wiper motor will be switched on while the pump will not as yet be operated, while when the control rod is further pulled out, the pump will also be operated. Consequently, since the pump then returns of its own accord to its neutral position and thereby draws in a new charge of washing liquid, it may be operated repeatedly while the switch remains in the engaged position, and the switch will not be disengaged to stop the wiper motor until the control rod is pushed in completely by hand.

These and other objects, features, and advantages of the present invention will become further apparent from the following detailed description thereof, particularly when read with reference to the accompanying drawings, in which—

FIGURE 1 shows a side view of a pump according to the invention which is mounted on the dashboard of a car;

FIGURE 2 shows a side view of one embodiment of the pump according to FIGURE 1 in the operative position thereof and largely in cross section;

FIGURE 3 shows a view similar to FIGURE 2 of the preferred embodiment of the invention; while FIGURE 4 shows a perspective view, partly broken away, of a further modification of the present invention comprising a rotary switch which is adapted to be combined with a pump, the bellows of which is omitted to facilitate the illustration of the invention.

In the drawings, the present invention is shown as being applied to a bellows pump, although it may also be applied to a pump of the piston type. The pump as shown particularly in FIGURES 1 and 2 essentially consists of a rubber bellows 1 having a connecting piece 2 serving as an inlet and outlet for the washing liquid, a control rod or plunger 3 extending through the rubber bellows 1 and carrying a control knob 4 on its outer end, and a pressure plate 5 connected to the other end of control rod 3 and adapted to compress the bellows 1 when control knob 4 is being pulled out. Bellows 1 is secured to an end wall 6 of a housing or support means 7 of a suitable insulating material, for example, a plastic, the other end of which terminates in a bushing 8 with outer screw threads 9 thereon. As indicated in FIGURE 1, the pump is intended to be mounted on the rear side of the dashboard 10 of an automobile solely by means of bushing 8 which is inserted through the dashboard 10 and secured thereto by a nut 11. Housing or support means 7 contains a switch member 12 with a tubular bushing 13 thereon which is slidable within bushing 8 and, in turn, slidably supports the control rod 3 which extends through switch member 12. A coil spring 14 is loosely mounted on control rod 3 and slidably guided within a bushing 15 which connects end wall 6 of housing 7 to the base 16 of rubber bellows 1. One end of spring 14 acts upon or is secured to pressure plate 5, while the other end acts upon the surface of switch member 12. Switch member 12 carries a pair of opposite, interconnected resilient contacts 17 which are adapted to engage with a pair of contacts 18 on the inner wall of housing 7 which are connected to terminals 20 on the outside of housing 7 for connecting the switch to the circuit of the windshield wiper motor, not shown.

If control knob 4 is at first only slightly pulled outwardly to the position indicated in FIGURE 2 in dotted lines, spring 14 acts upon switch member 1 and shifts the same to the position as shown, in which the switch contacts 17 bridge the connecting terminals 18 so that the circuit of the wiper motor will be closed and the latter will start to run. As long as control knob 4 is not pulled out any further, the switch will remain in this position. If, however, control knob 4 is further pulled out to the position shown in FIGURE 2 in full lines, pressure plate 5 on control rod 3 compresses the bellows 1 and thereby pumps the washing liquid therefrom so that the latter is sprayed upon the windshield. Spring 14 has thereby been so strongly compressed that, when control knob 4 is released, bellows 1 will—under its own resilience as well as under the action of spring 14—retract the control rod 3 until bellows 1 is again fully expanded and control knob 4 engages with the outer edge 21 of bushing 13. If control knob 4 is then pushed inwardly by hand, it pushes bushing 13 and switch member 12 thereon forwardly, whereby contacts 17 will disengage from terminals 18 and come to rest on stops 19, whereby the wiper motor will be switched off.

Consequently, since the pump after being compressed and after control knob 4 is released always returns of its own accord to its fully expanded position and thereby draws in a new charge of washing liquid, and since by such return movement it retracts control rod 3 and knob 4 only to the position as indicated in dotted lines in FIGURE 2, the pump may, if desired, be operated repeatedly without disengaging the switch and without affecting the continued operation of the wiper motor.

FIGURE 3 illustrates a more simplified modification of the inventive combination of a windshield washer pump with a switch for operating the windshield wiper motor. The rubber bellows 1' is likewise compressed by a pressure plate or member 5' which, however, is in this case connected to control rod 3' so as to be freely rotatable thereon. The switch member 12' in housing or support means 7' is secured directly to control rod 3' which is slidable as well as rotatable within a bushing 8' by means of which the entire unit may be secured to the dashboard of an automobile in the same manner as shown in FIGURE 1. Switch member 12' carries a pair of opposite, interconnected resilient contacts 17', while the switch housing 7' carries on its inner wall a pair of opposite contact bars 22 which extend parallel to the axis control rod 3' and are connected to terminals 20' which, in turn, may be connected to the circuit of the windshield wiper motor. When the control knob 4' is turned to one position, as shown in FIGURE 3, contacts 17' will be in engagement with contact bars 22 so that the wiper motor will be switched on. Control knob 4' may then be pulled out and released as often as may be desired to squirt one or more streams of washing liquid upon the windshield. During such operation of the pump, contacts 17 slide back and forth along contact bars 22, keeping the wiper motor in continued operation. If control knob 4' is turned to another position, contacts 17' will be disengaged from contact bars 22 so that the wiper motor will be switched off. The pump may thus be operated while the switch is either in the on position or in the off position, and the switch may also be operated while the pump remains in the inoperative position. If desired, suitable means, not shown, may also be provided to guide the control rod 3' so as to be slidable only in two positions of rotation of control knob 4' corresponding to the on and off positions of the switch. Bellows 1 of this embodiment has a resilience of such a strength that, after control knob 4' has been pulled out and is then released, the bellows will expand of its own accord and thereby draw in another charge of washing liquid, and also retract control rod 3' regardless of whether switch member 12' is in the on or off position.

FIGURE 4 illustrates a further modification of the invention, in which the rubber bellows 1 as well as the pressure plate 5 and the control knob 4 on the opposite ends of the control rod 3, similarly as shown in FIGURES 2 and 3, are omitted for the sake of clarity of the illustration. A support or base plate 23 which is adapted to rest against the rear side of the rubber bellows is secured to a hollow shaft 24 by a pair of projections 24' on the latter fitting into a pair of corresponding recesses in plate 23. A connecting piece 25 at the lower end of shaft 24 is to be inserted into the rubber bellows. A bushing 26 at the upper end of shaft 24 guides the control rod 3 and is provided with outer screw threads for securing the entire pump and switch unit to the dashboard in the same manner as shown in FIGURE 1. Shaft 24 carries a ring 27 which is rotatable thereon and may serve as a switch housing or support. Ring 27 has in its lower side an annular recess 28 into which a contact ring 29 is loosely inserted which is provided at its lower side with contact points 30 projecting in the direction toward base plate 23, and at the upper side with studs 31 each of which carries a spring 32 which is inserted into a recess 33 in the bottom of the annular recess 28 to press the contact ring 29 downwardly and also to maintain the latter from sliding relative to ring 27. The upper surface of base plate 23 has individual recesses therein each of which contains a contact plate 34 on the end of a terminal strip 35 which extends to the outside of base plate 23 to be connected to the circuit of the wiper motor.

The plate 23, shaft 24, and ring 26 together form the support or housing means for the switch and pump of FIGURE 4.

Operation of the switch is insured in the following manner. Control rod 3 has a longitudinal groove 36 into which a pin 37 engages which is inserted into a bore 38 in ring 27 and extends through a slot-shaped aperture 39 in the stationary shaft 24. The end walls 40 of aperture 39 may serve as stops for limiting the extent of the movement of pin 37 and of the rotation of control rod 3 and ring 27 with contact ring 29 thereon. Groove 36 in control rod 3 has a length in accordance with the maximum movement of rod 3 required for compressing the rubber bellows on connecting piece 25 and for allowing it again to expand when the control knob on the upper end of rod 3 is released. When the control rod 3 is rotated within the central aperture of the stationary shaft 24, the pin 37 is automatically carried therewih since the pin is inserted into slot 36 of the control rod 3. Ring 27 is, accordingly, rotated during rotation of control rod 3 through the action of pin 37. During axial movement of control rod 3, the pin 37 is not rotated since it slides within slot 36, and, accordingly, the ring 27 is also not rotated. Rotation of the ring 27 causes rotation of contact 29 and engagement and disengagement between contacts 29 and 34. The switch according to FIGURE 4 may therefore be operated by turning the control knob on rod 3, regardless of whether rod 3 is pulled out, retracted, or in any intermediate position.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In the combination of the pump for the windshield washing apparatus of a motor vehicle and an electric switch means for controlling the operation of the windshield wiping motor of said vehicle, said pump and said switch means being combined to form a single unit, the improvement comprising common means for operating said pump and said switch independently of each other as well as simultaneously with each other, said common means comprising a housing secured to said pump, a control rod with a control knob thereon for operating said pump rotatably and slideably supported by said housing, at least one contact secured to said control rod within said housing, and at least one contact bar extending parallel to said control rod within said housing, said contact on said control rod engaging with said contact bar when said control knob and the control rod thereon are rotated to one position and disengaging from said contact bar when said control knob and the control rod thereon are rotated to another position, said contact on said control rod when in said first position being arranged so as to remain in engagement with said contact bar in any axially shifted position of said control rod and be disengaged from said contact bar by rotation of said control knob in any axially shifted position of said control rod.

2. In the combination of the pump for the windshield washing apparatus of a motor vehicle and an electric switch means for controlling the operation of the windshield wiper motor of said vehicle, said pump including a pump body and a movable pump element, and said pump and said switch means being combined to form a single unit, the improvement comprising common means for operating said pump and said switch independently of each other as well as simultaneously with each other, said common means comprising a cylindircal member having a central aperture, means on said member for securing the same in a stationary position, an enlarged base on one end of said member adapted to be connected at its free side to said pump body, a control rod extending through said central aperture of said cylindrical member and said base and connected at one end to said pump element for reciprocating the same relative to said pump body to operate said pump, said control rod having an elongated recess therein extending in the axial direction thereof, a control knob on the other end of said control rod, said cylindrical member having an elongated aperture in its wall extending a direction transverse to the axis of said member, an outer annular member surrounding said stationary cylindrical member and having a bore extending radially through its wall, a pin mounted in said bore and extending through said elongated transverse aperture in said stationary cylindrical member into said elongated axial recess in said control rod to permit said control rod to slide in the axial direction within said central aperture of said cylindrical member but to take along said outer annular member when said control rod is rotated, at least one stationary contact on said base, and at least one resilient contact member on said outer annular member adapted to engage with and disengage from said stationary contact when said control knob is rotated to rotate said control rod and said outer annular member relative to said base regardless of the position to which said control rod is shifted in its axial direction to reciprocate said pump element relative to said pump body.

3. A device as defined in claim 2, in which said elongated transverse aperture in said stationary cylindrical member is limited by two end surfaces, said end surfaces forming stops to limit the extent of the rotary movement of said outer annular member, said control rod, and the control knob thereon.

4. A device as defined in claim 2, in which said outer annular member has a substantially annular groove in its end wall facing toward said base, said resilient contact member comprising a substantially ring-shaped contact member inserted into said groove so as to be nonrotatable therein but to be slidable in the direction toward said base, and spring means within said annular member acting upon said contact member to urge the same in the direction toward said base.

5. In the combination of a pump for a windshield-washing apparatus of a motor vehicle including a housing and a bellows means secured thereto and an electric switch means for controlling the operation of a windshield wiper motor of said motor vehicle, said pump and said switch means being combined to form a single unit, the improvement comprising common means for operating said pump and said switch independently of each other as well as simultaneously with each other, said common means comprising a control rod for operating said pump, said control rod extending through said housing and said bellows, said control rods being supported by said housing for rotatable and axially-slidable movement through said housing, a pressure member attached to the end of said control rod adjacent said bellows for compressing said bellows when said control rod is moved axially through said housing, at least one contact secured to said control rod within said housing, and at least one contact bar extending parallel to said control rod within said housing, said contact on said control rod engaging with said contact bar when said control rod is rotated to one position, and disengaging from said contact bar when said control rod is rotated to another position, said contact on said control rod when in said first position being arranged so as to remain in engagement with said contact bar during axial sliding of said control rod and to be disengaged from said contact bar by rotation of said control rod in any axially-shifted position of said control rod.

6. In the combination of a pump for a windshield-washing apparatus of a motor vehicle comprising a rubber bellows and an electric switch means for controlling the operation of a windshield wiper motor of said motor vehicle, said pump and said switch means being combined to form a single unit and including a support means, said bellows being secured to said support means, the improvement comprising common means for operating said pump and said switch independently of each other as well as simultaneously with each other, said common means comprising a control rod for operating said pump, said control rod extending through said support means and said bellows, said control rod being rotatable in said support means and axially slidable through said support means, a pressure member attached to the end of said control rod adjacent said bellows for compressing said bellows when said control rod is moved axially through said support means, at least one contact means, means for operatively securing said contact means to said control rod within said support means for rotation by said control rod into two positions, and at least one other contact means disposed within said support means said secured thereto, said two contact means being engaged when said contact means operatively secured to said control rod is in one of said positions and being disengaged when said last-mentioned contact means is in the other of said positions, said contact means on said control rod when in said one position engaging with said other contact means within said support means in any axially shifted position of said control rod and being disengaged from said other contact means within said support means by rotation of said control rod in any axially shifted position thereof.

References Cited in the file of this patent

UNITED STATES PATENTS

| | | |
|---|---|---|
| 435,931 | Herrick | Sept. 9, 1890 |
| 2,206,814 | Horton | July 2, 1940 |
| 2,876,483 | Neufeld | Mar. 10, 1959 |
| 2,933,048 | Bock et al. | Apr. 19, 1960 |

FOREIGN PATENTS

| | | |
|---|---|---|
| 216,941 | Australia | Sept. 3, 1958 |